US011411927B2

(12) United States Patent
Zhao et al.

(10) Patent No.: US 11,411,927 B2
(45) Date of Patent: Aug. 9, 2022

(54) ACCESSING AN AUTHENTICATION SERVICE FROM A CLOUD DOMAIN IN A NETWORK ZONE DIFFERENT FROM THAT OF THE AUTHENTICATION SERVICE

(71) Applicant: VMware, Inc., Palo Alto, CA (US)

(72) Inventors: YiSan Zhao, Beijing (CN); Nan Wang, Beijing (CN); Wen Wang, Beijing (CN); Xiangrui Meng, Beijing (CN); Jingtao Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 172 days.

(21) Appl. No.: 16/793,802

(22) Filed: Feb. 18, 2020

(65) Prior Publication Data

US 2021/0218712 A1    Jul. 15, 2021

(30) Foreign Application Priority Data

Jan. 9, 2020   (WO) ............... PCT/CN2020/071083

(51) Int. Cl.
*H04L 29/06* (2006.01)
*H04L 9/40* (2022.01)
(Continued)

(52) U.S. Cl.
CPC .......... *H04L 63/04* (2013.01); *H04L 63/0884* (2013.01); *H04L 63/18* (2013.01); *H04L 63/20* (2013.01)

(58) Field of Classification Search
CPC ......... H04L 63/04; H04L 63/20; H04L 63/18; H04L 63/0884; H04L 63/029; H04L 63/08; H04L 63/02
See application file for complete search history.

(56) References Cited

U.S. PATENT DOCUMENTS

| 8,955,072 B2 | 2/2015 | Wilkinson et al. |
| 2017/0063674 A1 | 3/2017 | Maskalik et al. |
| 2018/0063074 A1* | 3/2018 | Shankarappa ...... H04L 61/2592 |

FOREIGN PATENT DOCUMENTS

WO   WO-2018160226 A1 *  9/2018  ........... G06F 21/606

OTHER PUBLICATIONS

Nm Sahri; Koji Okamura; "Protecting DNS services from IP spoofing: SDN collaborative authentication approach"; CFI '16: Proceedings of the 11th International Conference on Future Internet Technologies; Jun. 2016; pp. 83-89 (Year: 2016).*

(Continued)

*Primary Examiner* — Shewaye Gelagay
*Assistant Examiner* — Courtney D Fields
(74) *Attorney, Agent, or Firm* — Kim & Stewart LLP

(57) ABSTRACT

A method of establishing a secure communication channel from a first edge device that is in a first network zone across a secure overlay network to a second edge device that is in a second network zone, so that access to a computing device that is in the second network zone can be authenticated by an authentication service that is in the first network zone, includes the steps of establishing a first secure communication channel from the first edge device to the secure overlay network, receiving a request to join the secure overlay network along with administrator credential information and, responsive to the request, transmitting the administrator credential information to the authentication service for authentication through the first secure communication channel and the first edge device, and establishing a second secure communication channel from the second edge device to the secure overlay network if the authentication is received from the authentication service.

17 Claims, 5 Drawing Sheets

(51) Int. Cl.
*G06F 9/24* (2006.01)
*G06F 21/57* (2013.01)

(56) References Cited

OTHER PUBLICATIONS

Metzler et al. "The 2017 Guide to WAN Architecture & Design," Feb. 2017, 15 pages, retrieved Feb. 18, 2020 from URL: http://wan.velocloud.com/rs/098-RBR-178/images/Metzler-2017-Guide-to-WAN-Architecture-and-Design.pdf.

Uppal et al. "Software-Defined WAN for dummies," VMware 2nd Special Edition, Copyright © 2018 John Wiley & Sons, Inc., 62 pages, retrieved Feb. 18, 2020 from URL: http://wan.velocloud.com/rs/098-RBR-178/images/SD_WAN_For_Dummies_VMware_2nd_SpecialEdition.pdf.

"Active Directory and Active Directory Domain Services Port Requirements," Microsoft Corporation, Jun. 18, 2014, 4 pages, retrieved Feb. 18, 2020 from URL: http://technet.microsoft.com/en-us/library/dd772723(WS.10).aspx.

"NetJoinDomain function," Microsoft Corporation, Dec. 5, 2018, 11 pages, retrieved Feb. 18, 2020 from URL https://docs.microsoft.com/en-us/windows/desktop/api/lmjoin/nf-lmjoin-netjoindomain.

"VMware SD-WAN by VeloCloudTM for Service Providers," Product Overview, Copyright © 2020 VMware, Inc., 8 pages, retrieved Feb. 18, 2020 from URL: http://www.velocloud.com/solutions/service-providers/.

"VMware SD-WAN by VeloCloud Virtual Edge," Product Overview, VeloCloud Networks, Inc./VMware, Inc., 2020, 4 pages, retrieved Feb. 18, 2020 from URL: https://aws.amazon.com/marketplace/pp/VeloCloud-Networks-Inc-MMware-NSX-SD-WAN-by-VeloCI/B073RJGCY5.

\* cited by examiner

410 →

| Customer | VMC Account Name | Domain Name | DNS IP | Join Username | SD-WAN Edge Info |
|---|---|---|---|---|---|
| Foo | admin@foo.com | omprem.foo.local | 10.5.0.10 | Administrator | Sd-wan-edge-<uuid>-001 |
| | | | | | |
| | | | | | |

| Customer | VMC Account Name | Domain Name | DNS IP | Join Username | SD-WAN Edge Info |
|---|---|---|---|---|---|
| Foo | admin@foo.com | omprem.foo.local | 10.5.0.10 | Administrator | Sd-wan-edge-<uuid>-001 |
| Foo | admin@foo.com | azure.foo.local | 10.4.0.10 | Administrator | Sd-wan-edge-<uuid>-002 |
| | | | | | |

FIGURE 7

ACCESSING AN AUTHENTICATION SERVICE FROM A CLOUD DOMAIN IN A NETWORK ZONE DIFFERENT FROM THAT OF THE AUTHENTICATION SERVICE

CROSS-REFERENCE

This application is based upon and claims the benefit of priority from International Patent Application No. PCT/CN2020/071083, filed on Jan. 9, 2020, the entire contents of which are incorporated herein by reference.

BACKGROUND

Cloud services, such as software as a service also known as SaaS, and platform as a service also known as PaaS, are increasingly being deployed in public clouds, and service providers have benefitted by reducing their investment on infrastructure and maintenance. The use of such public clouds can be challenging because it is not easy to bridge networks of the different public clouds and between a public cloud and a private, on-premise data center, e.g., when a virtual desktop infrastructure (VDI) is deployed in one network zone (e.g., a public cloud) and a directory service that provides authentication service (e.g., Microsoft Active Directory®) to the VDI is located in a different network zone (e.g., a different public cloud or an on-premise data center).

One way to provide a secure communication channel to the authentication service is to establish a Virtual Private Network (VPN) tunnel between the different network zones. However, the process of manually configuring the VPN tunnel is complicated and an error-prone process, thereby increasing the workload of an IT administrator. Accordingly, there is a need for improving the way a secure communication channel is established between network zones in situations where computing devices that require an authentication service to be accessed and a computing device that hosts the authentication service are located in different network zones.

SUMMARY

One or more embodiments provide a method of establishing a secure communication channel from a first edge device that is in a first network zone across a secure overlay network to a second edge device that is in a second network zone that is different from the first network zone, so that access to a computing device that is in the second network zone can be authenticated by an authentication service that is in the first network zone, includes the steps of establishing a first secure communication channel from the first edge device to the secure overlay network, receiving a request to join the secure overlay network along with administrator credential information and, responsive to the request, transmitting the administrator credential information to the authentication service for authentication through the first secure communication channel and the first edge device, and establishing a second secure communication channel from the second edge device to the secure overlay network if the authentication is received from the authentication service.

Further embodiments include, without limitation, a non-transitory computer-readable storage medium that includes instructions for a processor to carry out the above method, and a computer system that includes a processor programmed to carry out the above method.

BRIEF DESCRIPTION OF THE DRAWINGS

FIG. 4 illustrates a policy table that is created according to one or more embodiments.

FIG. 7 illustrates the table of FIG. 4 that is updated according to one or more embodiments.

DETAILED DESCRIPTION

According to one or more embodiments, in order to provide an authentication service, e.g., Microsoft Active Directory® (AD), that is located in a first network zone (e.g., private, on-premise data center) to virtual desktop infrastructure (VDI) deployed in a second network zone (e.g., a public cloud), software-defined wide area network (SD-WAN) edge devices are deployed to provide a network path between the two network zones. SD-WANs that may be used in one or more embodiments include VMware's Velo-Cloud®.

Figure 1:
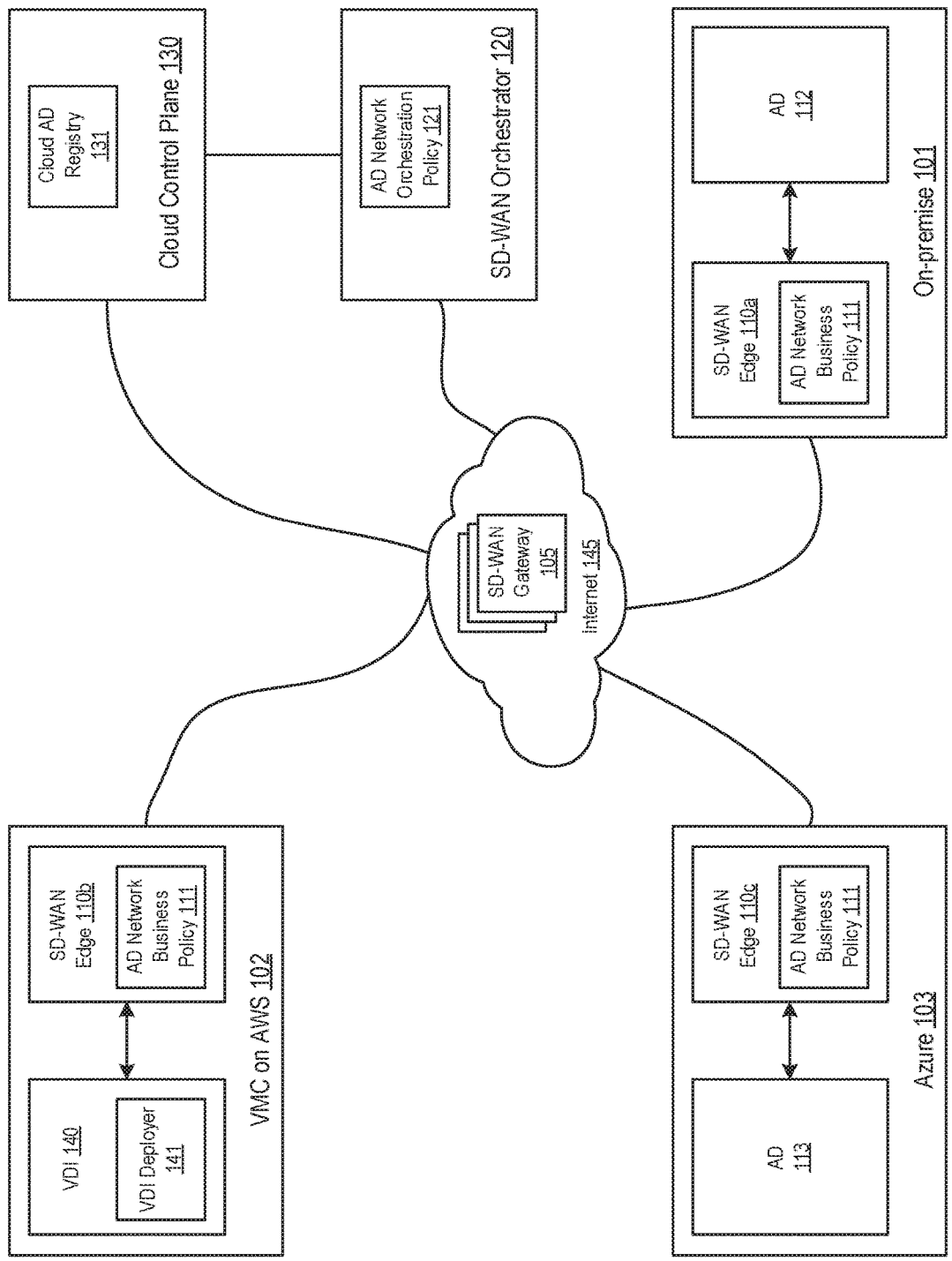
FIG. 1 is a block diagram showing connectivity between different network zones across which one or more embodiments may be implemented.

FIG. 1 is a block diagram showing connectivity between different network zones across which one or more embodiments may be implemented. In FIG. 1, cloud network zones are illustrated as VMware Cloud on AWS® (VMC on AWS) 102 and Azure® 103, and on-premise network zone, in which the authentication service depicted as AD 112 is located, is illustrated as on-premise 101. Two other software components running on physical or virtual servers are also illustrated in FIG. 1. They are SD-WAN orchestrator 120, which orchestrates the deployment of SD-WAN devices, and cloud control plane 130, which manages the deployment of VDIs in cloud environments. AD network orchestration policy 121 is maintained by SD-WAN orchestrator 120 and it contains information about the authentication service, including customer name, account ID, domain name, DNS IP address, join username, and ID of the SD-WAN device through which the authentication service can be accessed. Cloud AD registry 131 is maintained by cloud control plane 130 and it contains information about the authentication service for all tenants of the cloud managed by cloud control plane 130.

SD-WAN gateway 105 is an example of a secure overlay network, which is provisioned as a plurality of SD-WAN devices across a plurality of nodes of Internet 145. Alternatively, SD-WAN gateway 105 may be provisioned as a plurality of SD-WAN devices across a plurality of nodes of a combination of public and private networks.

Each of SD-WAN edges 110*a*, 110*b*, 110*c* operates as a gateway edge device in each of the different network zones. Before a new SD-WAN edge can participate in the secure overlay network, it needs to be first authenticated to SD-WAN orchestrator 120. Once the new SD-WAN edge is authenticated, it downloads its assigned policy including AD network business policy 111, and is granted access to the secure overlay network. Based on the policy assigned to the SD-WAN edge, sensitive traffic can have separate encryption keys to isolate itself from non-sensitive traffic passed by the SD-WAN edge to other network components. AD network business policy 111 contains information that each SD-WAN edge uses to decide the network path over which it accesses the authentication service.

As further depicted in FIG. 1, a VDI 140 is deployed in VMC on AWS 102. VDI deployer 141 is the software component running on a physical or virtual server within VMC on AWS 102 for deploying VDI 140. In the embodiments illustrated herein, an authentication service for VDI 140 is not provided locally in VMC on AWS 102 but located in a different network zone. In one embodiment, an authentication service for VDI 140 is provided by AD 112, which is located in on-premise 101, a different network zone. In another embodiment, the authentication service for VDI 140 is provided by AD 113, which is located in Azure 103, which is both a different cloud domain and a different network zone.

Figure 2:
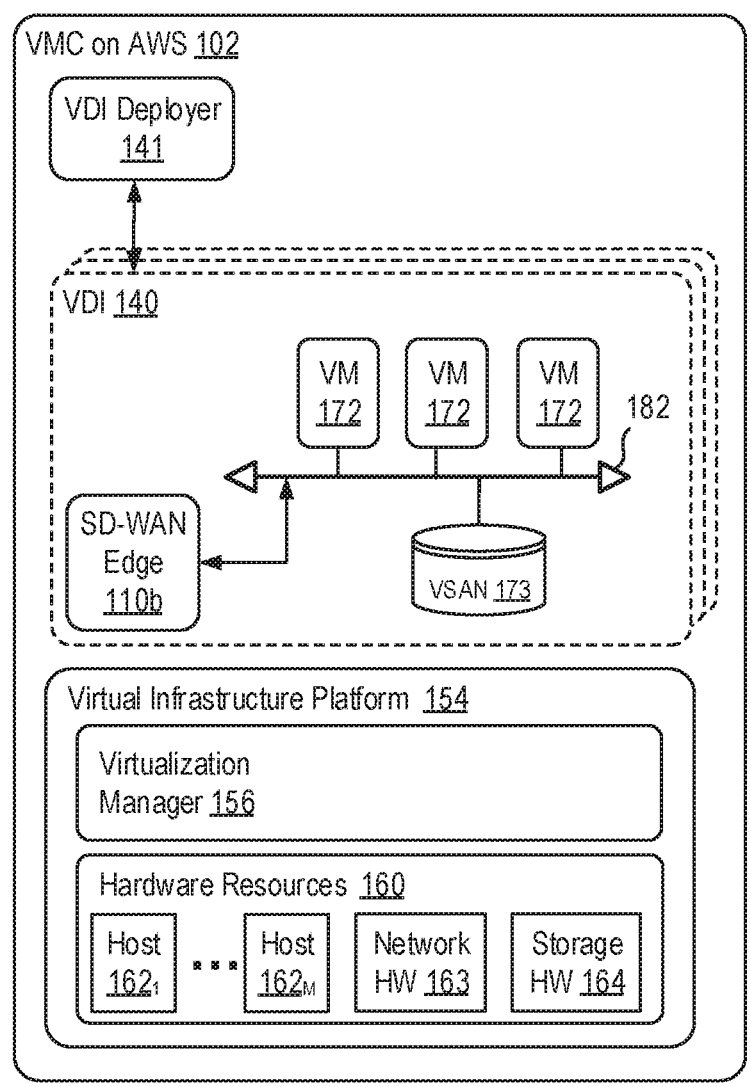
FIG. 2 is a diagram showing components of a cloud domain that is in one of the network zones shown in FIG. 1.

FIG. 2 is a diagram showing components of VMC on AWS 102 in further detail.

Virtual infrastructure platform 154 includes a virtualization manager 156 which provisions virtual resources from hardware resources 160, which include a plurality of hosts 1621-M, network hardware 163, and storage hardware 164. The provisioned virtual resources include virtual machines (VMs) 172, virtual networks 182, and virtual storage area networks (VSANs) 173. A cloud director of VMC on AWS 102 (not illustrated) divides the virtual resources across different cloud computing environments, one of which is used by VDI deployer 141 to deploy VDI 140. In one embodiment, one of VMs 172 is specially configured to functions as SD-WAN edge 110b, and all communications into and out of VDI 140 pass through SD-WAN edge 110b.

Figure 3:
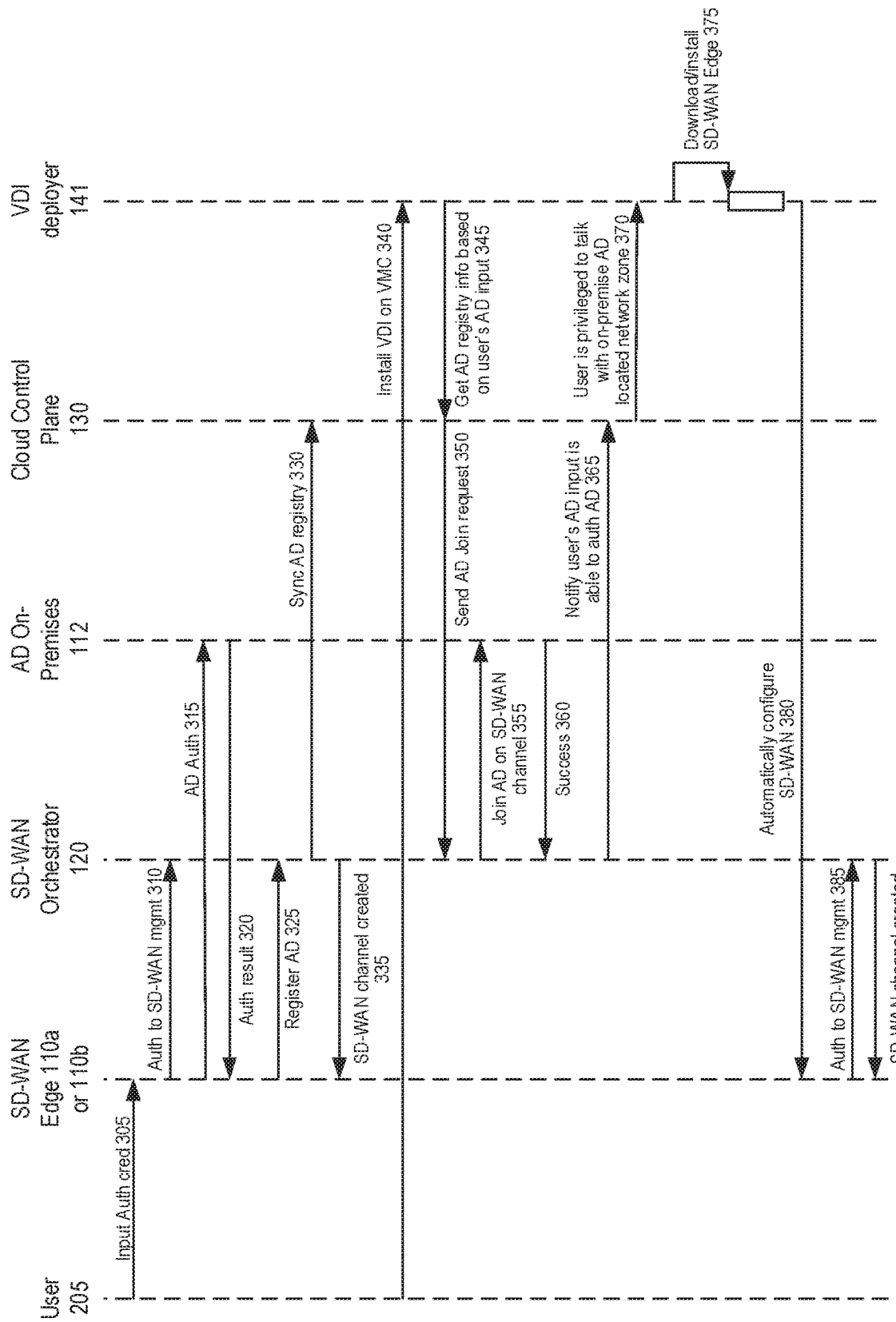
FIG. 3 shows a signal/message flow illustrating a method of establish a secure communication channel according to one or more embodiments.

FIG. 3 shows a signal/message flow illustrating a method of establish a secure communication channel according to one or more embodiments. The method begins when a user 205, who is logged into a system administrator console located in on-premise 101, configures a physical or virtual appliance as SD-WAN edge 110a, and inputs authentication credentials (as shown by signal path 305), as part of a bootstrapping process for SD-WAN edge 110a. SD-WAN edge 110a then passes on the authentication credentials to SD-WAN orchestrator 120 (as shown by signal path 310), and also to AD 112 located in on-premise 101 (as shown by signal path 315). The authentication returned by AD 112 is represented by signal path 320 from AD 112 to SD-WAN edge 110a. Once SD-WAN edge 110a obtains the authentication, SD-WAN edge 110a notifies SD-WAN orchestrator 120 (as shown by signal path 325) to register the authenticated SD-WAN edge 110a in AD network orchestration policy 121 (see FIG. 4 for an example of a policy table in which the information about the authenticated SD-WAN edge 110a is registered). Subsequently, SD-WAN orchestrator 120 notifies cloud control plane 130 (as shown by signal path 330) of the authenticated SD-WAN edge 110a so that cloud control plane 130 can synchronize cloud AD registry 131 with this information, and also notifies SD-WAN edge 110a (as shown by signal path 335) that SD-WAN channel has now been created. In response, SD-WAN edge 110a downloads the just updated AD network orchestration policy 121 into its AD network business policy 111 so that it will know how to access the authentication service.

FIG. 4 shows an example of an AD network orchestration policy table 410 that is created as a result of authentication of SD-WAN edge 110a. As shown, an authenticated customer 'Foo' is registered with the customer's respective account information, domain name of the customer's local network (in the example given above, domain name of on-premise 101), DNS IP address, join username (username by which the customer joined the SD-WAN), and ID information of the authenticated SD-WAN edge 110a. As discussed above, AD network orchestration policy table 410 containing the updated information is replicated in cloud AD registry 131.

Subsequent signal path flows of FIG. 3 represents steps carried out by an administrator to deploy VDI 140 in a cloud domain, e.g., VMC on AWS 102, and establish a secure communication channel between VMC on AWS 102 and on-premise 101 so that AD 112 can provide the authentication service to VDI 140.

Figure 5:
FIG. 5 shows an example of an input interface used in connecting a cloud network zone to an on-premises network zone across a secure overlay network.

Signal path 340 represents the request from user 205 for the deployment of VDI 140, e.g., in VMC on AWS 102 using VDI deployer 141. The request includes VDI deployment task information that VDI deployer 141 uses to deploy VDI 140 in VMC on AWS 102. The VDI deployment task information includes AD join information that the user 205 has inputted through a user interface shown in FIG. 5, for example.

Figure 6:
FIG. 6 shows an example of code used to create a request to join the secure overlay network.

During VDI deployment, VDI deployer 141 detects that the AD specified in the AD join information is not located locally, i.e., in the same network zone as VDI 140. Therefore, VDI deployer 141 communicates with cloud control plane 130 to retrieve the information about the authentication service for this particular user (as determined from the AD join information) from cloud AD registry 131 (as shown by signal path 345). Then, using the information about the authentication service retrieved from cloud AD registry 131, cloud control plane 130 sends an AD join request to SD-WAN orchestrator 120 (as shown by signal path 350). An example of the AD join request is a join request code 600 shown in FIG. 6.

Responsive to the AD join request, SD-WAN orchestrator 120 passes on the AD join request through the authenticated SD-WAN edge 110a to AD 112 (as shown by signal path 355), and waits for confirmation of the AD join request. Once the AD join request has succeeded, the message "Success" is returned by AD 112 to SD-WAN orchestrator 120 (as shown by signal path 360).

Subsequent to receiving the message "Success" SD-WAN orchestrator 120 notifies cloud control plane 130 that the AD join request that cloud control plane 130 sent to SD-WAN orchestrator 120 was successful (as shown by signal path 365). Thereafter, as shown by signal path 370, cloud control plane 130 informs VDI deployer 141 that the user has the proper privilege level to communicate with on-premise 101 (i.e., network zone of AD 112).

Responsive to detecting that the user has the proper privilege level to communicate with on-premise 101, VDI deployer 141 deploys and automatically configures SD-WAN edge 110b along with VDI 140, as shown by signal paths 375 and 380. The newly deployed SD-WAN edge 110b then downloads AD network orchestration policy 121 into its AD network business policy 111 so that it will know how to access the authentication service. The authentication of the newly deployed SD-WAN edge 110b by SD-WAN orchestrator 120 (as shown by signal path 385) is automatic because of the AD join request was successful. As a result, a new SD-WAN channel is created through SD-WAN edge 110b (as shown by signal path 390).

By carrying out the steps depicted in FIG. 3 and described above, the user is able to expand the network zone of VDI 140 in VMC on AWS 102 virtually to include the network zone of on-premise 101. The user can further expand the network zone of VDI 140 in VMC on AWS 102 virtually to include the network zone of Azure 103 in which another authentication service, AD 113, is located, by setting up an SD-WAN edge 110c in Azure 103 and authenticating SD-WAN edge 110c to SD-WAN orchestrator 120 in the manner described above. FIG. 7 shows AD network policy table 400 that is updated to include information about the new authentication service, AD 113, which is located in the network zone of Azure 103.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of establishing a secure communication channel from a first edge device that is in a first network zone across a secure overlay network to a second edge device that is in a second network zone that is different from the first network zone, so that access to a computing device that is deployed in the second network zone can be authenticated by an authentication service that is in the first network zone, said method comprising:

establishing a first secure communication channel from the first edge device that is in the first network zone, to the secure overlay network;

after the computing device has been deployed in the second network zone for a customer, receiving a request to join the secure overlay network along with administrator credential information of the customer and, responsive to the request, transmitting the administrator credential information of the customer to the authentication service for authentication through the first secure communication channel and the first edge device; and upon receiving the authentication from the authentication service, establishing a second secure communication channel from the second edge device that is in the second network zone, to the secure overlay network, wherein the access to the computing device that has been deployed in the second network zone is authenticated by the authentication service that is in the first network zone, through the second secure communication channel established from the second edge device to the secure overlay network and the first communication channel established from the first edge device to the secure overlay network, and wherein the request to join the secure overlay network is made by a control plane for a cloud computing platform of the customer provisioned in the second network zone and the computing device is one of a plurality of remote desktop virtual machines of the cloud computing platform of the customer.

2. The method of claim 1, wherein the first secure communication channel from the first edge device to the secure overlay network is established when the authentication service authenticates administrator credential information of the customer transmitted from the first edge device to the authentication service.

3. The method of claim 2, further comprising:

registering a unique identifier of the first edge device in a network policy table in association with a domain name and a DNS IP address of the first network zone, and a customer name, wherein the second edge device performs communications over the secure overlay network using the network policy table.

4. The method of claim 3, further comprising:

establishing a third secure communication channel from a third edge device to the secure overlay network, wherein the third edge device is located in a third network zone and is connected for communication with another authentication service, which is also located in the third network zone; and registering a unique identifier of the third edge device in the network policy table in association with a domain name and a DNS IP address of the third network zone, and the customer name.

5. The method of claim 1, further comprising:

notifying the control plane for the cloud computing platform of the customer that the authentication has been received from the authentication service.

6. A non-transitory computer readable medium comprising instructions that are executable in a processor of a computer system, wherein the instruction when executed in the processor cause the computer system to carry out a method of establishing a secure communication channel from a first edge device that is in a first network zone across a secure overlay network to a second edge device that is in a second network zone that is different from the first network zone, so that access to a computing device that is deployed in the second network zone can be authenticated by an authentication service that is in the first network zone, said method comprising:

establishing a first secure communication channel from the first edge device that is in the first network zone, to the secure overlay network;

after the computing device has been deployed in the second network zone for a customer, receiving a request to join the secure overlay network along with administrator credential information of the customer and, responsive to the request, transmitting the administrator credential information of the customer to the authentication service for authentication through the first secure communication channel and the first edge device; and upon receiving the authentication from the authentication service, establishing a second secure communication channel from the second edge device that is in the second network zone, to the secure overlay network, wherein the access to the computing device that has been deployed in the second network zone is authenticated by the authentication service that is in the first network zone, through the second secure communication channel established from the second edge device to the secure overlay network and the first communication channel established from the first edge device to the secure overlay network, and wherein the request to join the secure overlay network is made by a control plane for a cloud computing platform of the customer provisioned in the second network zone and the computing device is one of a plurality of remote desktop virtual machines of the cloud computing platform of the customer.

7. The non-transitory computer readable medium of claim 6, wherein the first secure communication channel from the first edge device to the secure overlay network is established when the authentication service authenticates administrator credential information of the customer transmitted from the first edge device to the authentication service.

8. The non-transitory computer readable medium of claim 7, wherein the method further comprises:

registering a unique identifier of the first edge device in a network policy table in association with a domain name and a DNS IP address of the first network zone, and a customer name, wherein the second edge device performs communications over the secure overlay network using the network policy table.

9. The non-transitory computer readable medium of claim 8, wherein the method further comprises:

establishing a third secure communication channel from a third edge device to the secure overlay network, wherein the third edge device is located in a third network zone and is connected for communication with another authentication service, which is also located in the third network zone; and registering a unique identifier of the third edge device in the network policy table in association with a domain name and a DNS IP address of the third network zone, and the customer name.

10. The non-transitory computer readable medium of claim 6, wherein the method further comprises:

notifying the control plane for the cloud computing platform of the customer that the authentication has been received from the authentication service.

11. An orchestration server for a software-defined wide area network (SD-WAN), the orchestration server including a hardware processor that is programmed to carry out a method of establishing a secure communication channel from a first SD-WAN edge device that is in a first network zone across the SD-WAN to a second SD-WAN edge device that is in a second network zone that is different from the first network zone, so that access to a computing device that is deployed in the second network zone can be authenticated by an authentication service that is in the first network zone, said method comprising:

establishing a first secure communication channel from the first SD-WAN edge device that is in the first network zone, to the SD-WAN;

after the computing device has been deployed in the second network zone for a customer, receiving a request to join the SD-WAN along with administrator credential information of the customer and, responsive to the request, transmitting the administrator credential information of the customer to the authentication service for authentication through the first secure communication channel and the first SD-WAN edge device; and upon receiving the authentication from the authentication service, establishing a second secure communication channel from the second SD-WAN edge device to the SD-WAN, wherein the access to the computing device that has been deployed in the second network zone is authenticated by the authentication service that is in the first network zone, through the second secure communication channel established from the second edge device to the secure overlay network and the first communication channel established from the first edge device to the secure overlay network, and wherein the request to join the secure overlay network is made by a control plane for a cloud computing platform of the customer provisioned in the second network zone and the computing device is one of a plurality of remote desktop virtual machines of the cloud computing platform of the customer.

12. The orchestration server of claim 11, wherein the first secure communication channel from the first SD-WAN edge device to the SD-WAN is established when the authentication service authenticates administrator credential information of the customer transmitted from the first SD-WAN edge device to the authentication service.

13. The orchestration server of claim 12, wherein the method further comprises:

registering a unique identifier of the first SD-WAN edge device in a network policy table in association with a domain name and a DNS IP address of the first network zone, and a customer name, wherein the second SD-WAN edge device performs communications over the SD-WAN using the network policy table.

14. The orchestration server of claim 13, wherein the method further comprises:

establishing a third secure communication channel from a third SD-WAN edge device to the SD-WAN, wherein the third SD-WAN edge device is located in a third network zone and is connected for communication with another authentication service, which is also located in the third network zone; and registering a unique identifier of the third SD-WAN edge device in the network policy table in association with a domain name and a DNS IP address of the third network zone, and the customer name.

15. The orchestration server of claim 11, wherein the method further comprises:
   notifying the control plane for the cloud computing platform of the customer that the authentication has been received from the authentication service.

16. The orchestration server of claim 11, wherein the first network zone is a network zone of a private data center and the second network zone is a network zone of a cloud domain.

17. The method of claim 1, wherein the first network zone is a network zone of a private data center and the second network zone is a network zone of a cloud domain.

* * * * *